United States Patent [19]

Zulch et al.

[11] 4,199,759
[45] Apr. 22, 1980

[54] SYSTEM FOR CORRELATING ELECTRONIC DISTANCE MEASUREMENT AND AERIAL PHOTOGRAPHY FOR THE EXTENSION OF GEODETIC CONTROL

[75] Inventors: Donald I. Zulch, Oneida; Robert Brock, Marcellus, both of N.Y.

[73] Assignee: The United States of America as represented by the Secretary of the Air Force, Washington, D.C.

[21] Appl. No.: 932,813

[22] Filed: Aug. 10, 1978

[51] Int. Cl.² .............................................. G01S 9/02
[52] U.S. Cl. .................................................. 343/6 R
[58] Field of Search ................................... 343/6 R

[56] References Cited

U.S. PATENT DOCUMENTS

| 2,655,649 | 10/1953 | Williams | 343/6 R |
| 3,183,478 | 5/1965 | Slawsky et al. | 343/6 R X |
| 3,469,260 | 9/1969 | Holt et al. | 343/6 R |
| 3,680,093 | 7/1972 | Brown | 343/6 R X |
| 3,766,552 | 10/1973 | Hajduk | 343/6 R |

Primary Examiner—T. H. Tubbesing
Attorney, Agent, or Firm—Joseph E. Rusz; Henry S. Miller

[57] ABSTRACT

A system for correlating electronic distance measurement and aerial photography where an airborne electronic location station is photographed as it passes over an area to be surveyed. The position of the airborne station is precisely measured as it moves and this information is included in the final image processing.

1 Claim, 3 Drawing Figures

SYSTEM FOR CORRELATING ELECTRONIC DISTANCE MEASUREMENT AND AERIAL PHOTOGRAPHY FOR THE EXTENSION OF GEODETIC CONTROL

STATEMENT OF GOVERNMENT INTEREST

The invention described herein may be manufactured and used by or for the Government for governmental purposes without the payment of any royalty thereon.

BACKGROUND OF THE INVENTION

This invention relates generally to geodetic ground control and more particularly to a system that provides a rapid accurate means for extending geodetic control.

Normally, the extension of geodetic control requires a substantial amount of time. Two processes must take place which are mutually exclusive and sequentially enacted. Where the extension is substantial, the first step is to establish a number of easily distinguishable known points on the ground, in the area where the control is to be extended. Once this very time consuming work is finished the area is photographed and a photogrammetric analysis made of the area and accurate maps produced from the information.

There are circumstances however, where the initial survey work cannot be performed. For example, if the area is owned or occuppied by persons hostile to the extension of geodetic control, where the terrain is of a nature that it is impractical to perform an accurate survey or where time is such an important factor it would be impossible to conduct a formal precision survey.

In some instances electronic beacons and ground control stations are utilized to guide aircraft. These devices may be placed in remote areas by helicopter or dropped by parachute. It is necessary that these systems along with an aircraft system be calibrated in both real time and non real time. It is also necessary that excessive bias errors be removed and precise location and altitude of terrain features determined.

The system proposed hereinafter eliminates the inadequacies and difficulties of the devices and systems used to date, called the prior art.

SUMMARY OF THE INVENTION

The invention is a system designed to combine in a unique manner, precision timing, precision photogrammetric resection, radar mapping and electronic distance measurement to extend accurate geodetic control. This system enables a common grid coordinate system to move without the delay normally attendant for accurate location of electronic guidance beacons and distance measuring equipment (DME) grid beacons.

There now exists four airborne real time sensor systems that utilize precision distance measurement to locate their present position and the position of the targets indicated by the sensors, in a geodetic coordinate system. These systems are active high resolution mapping and surveillance radar and precise direction finding systems to survey large areas. The systems are tied by electronic distance measuring to geodetic ground control previously surveyed.

The invention utilizes a low flying aircraft whose course and location is precisely known. The aircraft, known as an electronic location station (ELS), is photographed as it flys over the unknown area by either an aircraft or satellite. The precision location information is combined with a series of photos in a photogrammetric process thereby extending geodetic control into the unknown area.

While normally control is established with permanent markers, it is possible, with this system, to utilize prominent terrain features or electronic beacons either placed or dropped into the unknown area.

It is therefore an object of the invention to provide a system for correlating electronic distance measurement and aerial phtography for the extension of geodetic control.

It is another object of the invention to provide a system for the extension of geodetic control in inexcessible areas.

It is a further object of the invention to provide a system for the extension of geodetic control that provides precise measurement.

It is still another object of the invention to provide a system for the extension of geodetic control that is faster than any currently known system.

It is still a further object of the invention to provide an airborne system for the extension of geodetic control that eliminates excessive bias errors.

It is another object of the invention to provide an airborne system for the extension of geodetic control that provides the precise location and altitude of terrain features in unknown areas.

It is another object of the invention to provide an airborne system for the extension of geodetic control that combines low bandwidth, high accuracy, electronic distance measuring with high bandwidths, high resolution airborne camera imagery to obtain geodetic position.

It is another object of the invention to provide a system of utilizing high accuracy electronic distance measuring to eliminate errors in photo resection and photo intersection.

It is another object of the invention to provide a system of utilizing high accuracy electronic distance measuring to position ground beacons in radar maps.

These and other advantages, features and objects of the invention will become more apparent from the following description taken in connection with the illustrative embodiment in the accompanying drawing.

DESCRIPTION OF THE PREFERRED EMBODIMENT

Figure 1:
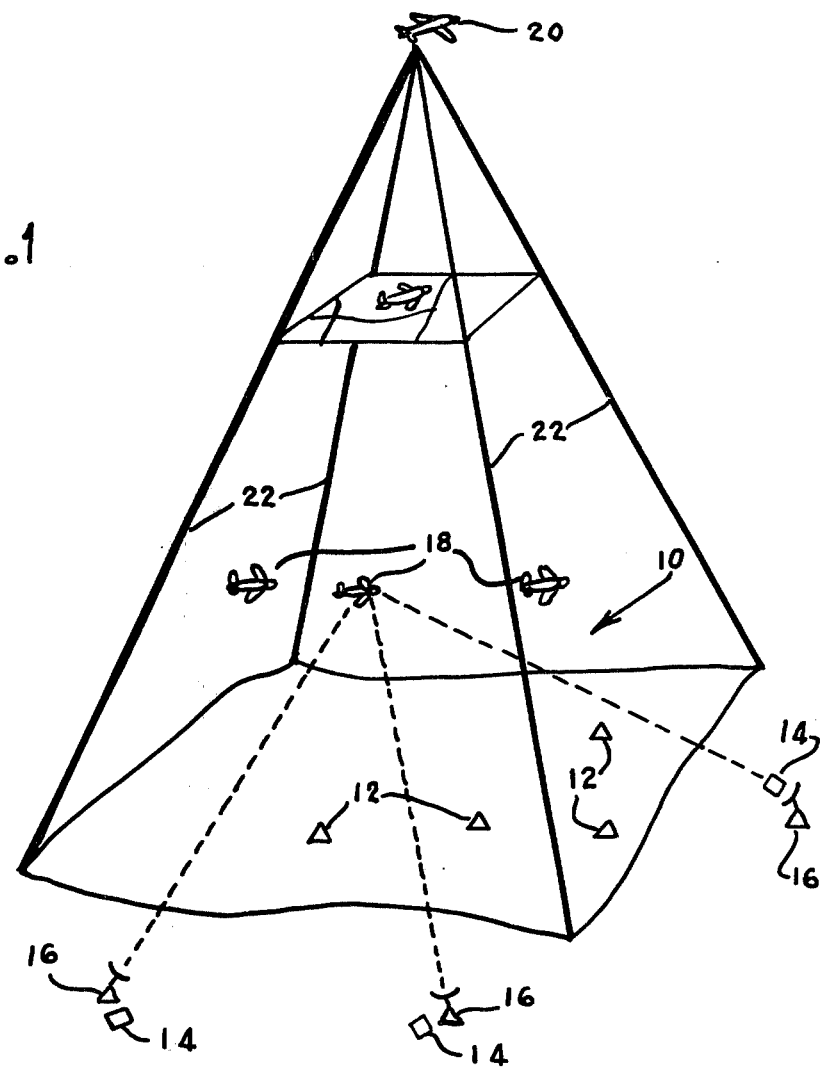
FIG. 1 is a perspective view of the system of the invention.

Referring now to FIG. 1 an area of unknown geodetic control is shown generally at 10 containing locations 12 which have no known precise location or altitude but have a remote ELS ground beacon. At some place outside the unknown area are a plurality of known geodetic positions 14. Situated on these known positions are electronic location stations (ELS) 16. Flying above the unknown area is an aircraft 18 known as an airborne ELS. Ground ELS stations precisely monitor the location of the airborne ELS as it transverses the unknown area.

At an altitude sufficiently above the airborne ELS is an aircraft or satellite 20. The vehicle 20 is equipped with a conventional system for photographic mapping which will photograph the unknown area shown by lines 22. Included in the photographs will be the airborne ELS vehicle 18.

Figure 1A:
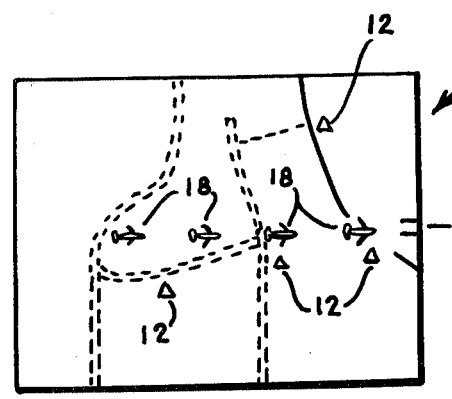
FIG. 1A is a plan view of the invention taken along lines A—A in FIG. 1.

FIG. 1A shows a photo data base including ELS 18 in sequence as it proceeds across the unknown area 10. The photo data base also shows the unknown locations 12 whose relative positions may be easily determined.

Figure 2:
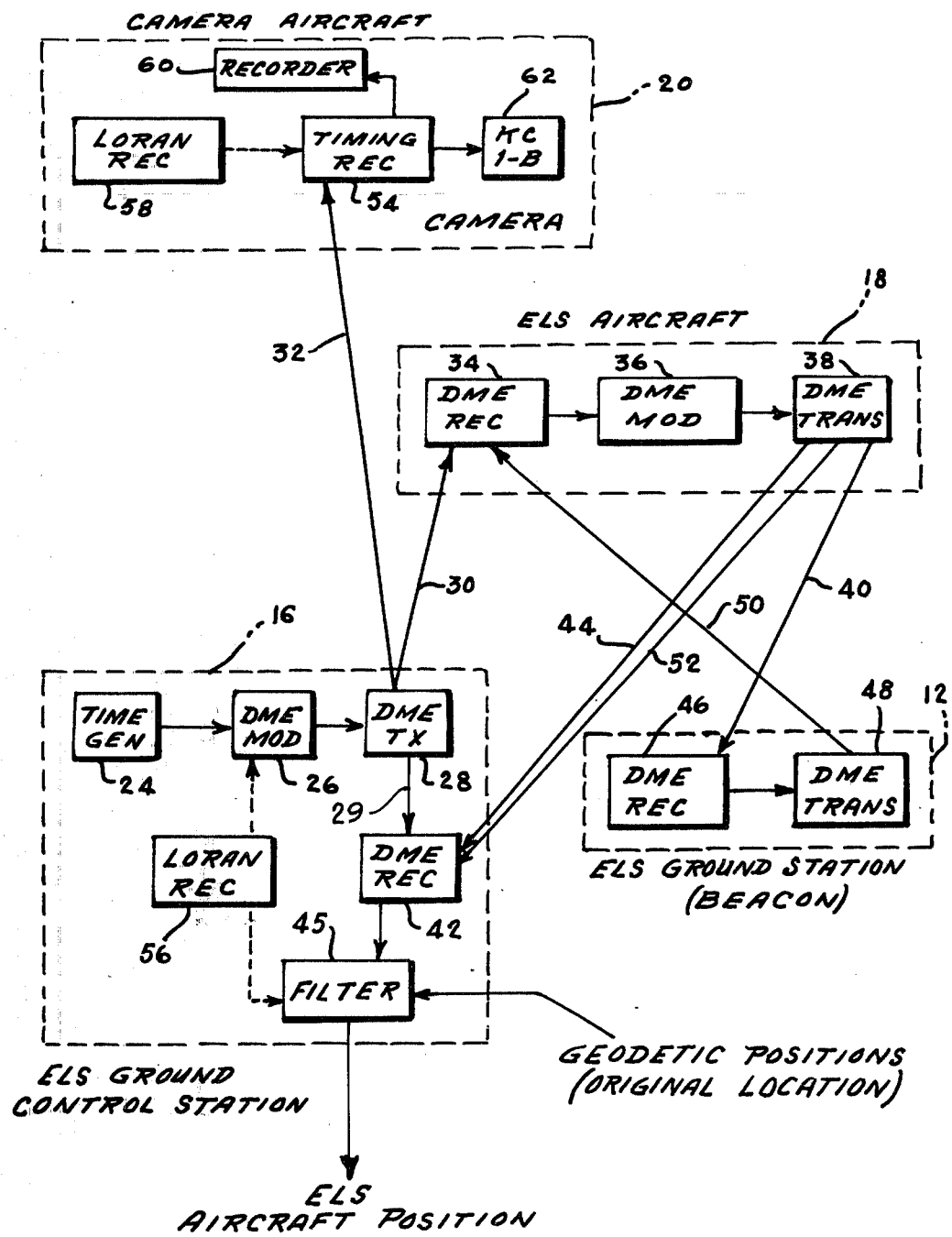
FIG. 2 is a box diagram of the system of the invention.

FIG. 2 discloses the system for coordinating the aerial photography and the electronic distance measurement made between the airborne ELS 18 and the ground stations 16. For purposes of explanation, only two ground stations are discussed. One of these stations is the ELS ground control station 16 and the other a ELS remote ground beacon 12. Functionally all ground beacon stations are alike, hence the remaining two stations are not shown.

The system is composed of four major units, the ELS ground control station 16, the remote beacon ground station 12, the ELS aircraft 18 and the camera aircraft 20 or satellite 20.

System timing is obtained from the time generator 24. A clock, accurate to one part in $10^{10}$ is adequate for daily operation and has a time signal sent to the Distance Measuring Modulator (DME MOD) 26. The DME MOD initiates a series of pulses for addressing the ELS aircraft 18 and ELS ground station beacon 12 and also identifies an external timing pulse for users outside the ELS system. Transmitter (DME TX) 28 receives the coded pulse train and timing signals and transmits these to the ELS aircraft along path 30 and to the camera aircraft 20 along path 32. Internally, the timing signal is sent from transmitter 28 to receiver 42 via line 29. The Distance Measuring Receiver (DME REC) 34 aboard ELS aircraft 18 decodes the transmitted signal, checks for errors and sets an internal clock to match the ground clock. The corrected clock signal is then sent to the Distance Measuring Modulator (DME MOD) 36. Receiver 34 also recognizes the signal addressed to the ELS ground station 12 and sends that signal to the modulator 36 and then to Distance Measuring Transmitter (DME TRANS) 38 and on to the remote ground station beacon 12 via path 40.

The corrected clock signal with the ELS aircraft (18) address is addressed for the ELS ground control station 16 by the modulator 36, sent to transmitter 38 which transmits to Distance Measuring Receiver (DME REC) 42 at the ELS ground control station (16) along path 44. The signal is checked for errors, data process, filtered at 45 (where the signal is compared with the time signal from 28), and a range is determined. The signal received at Distance Measuring receiver (DME REC) 46 is immediately transmitted by Distance Measuring Transmitter (DME TRANS) 48 without modification and sent along path 50 to receiver 34 where it is received, checked for errors, and sent to modulator 36 where the ELS ground station code is checked and the ELS ground control station address added. Modulator 36 transmits the ELS ground beacon signal to receiver 42 via path 52 where the signal is compared with the time signal from 28. Receiver (34) signal processing filters determine the round trip time from ground control station 16 to ELS aircraft 18 to ELS ground beacon 12 is determined. Similar data from two other ELS ground stations (not shown) provide similar time data.

Receiver 34 integrates a successive number of pulses to assure multipath is not present, signal to noise is high (20 dB or higher) and fits polynomials to filtered time (time is linearly related to range).

Initial geodetic position of the ELS ground control station and the three ELS ground stations are contained in receiver 34. The range measurements are related to the geodetic positions, therefore, the ELS aircraft position is determined in geodetic coordinates.

The timing signal for ELS is transmitted to the camera aircraft 20 and the timing receiver 54, where the timing signal is accepted and checked for error and the ELS aircraft signal and ELS ground station signal rejected. The timing pulse is amplified and trigger generated. After acceptance of the timing signal, a series of overlapping photographs are taken. The camera aircraft is higher in altitude than the ELS aircraft. The first frame of imagery will contain the ELS aircraft, all ground stations, and photo identifiable ground features. Subsequent photos will not have all the ground stations but will show the ELS aircraft because of the geometry selected.

Boxes 56 and 58 (LORAN REC) represent loran C receivers that could provide the accurate timing necessary.

A recorder 60 records the time of trigger initiation in system time. This would provide backup data to assist in the correlation of film data and distance measurement data.

The film exposed by camera 62 in the camera aircraft 20 is processed in the conventional manner and photographic coordinate of camera fiducials and imaged ground positions are measured on a precision comparator. Measured quantities are smoothed by standard least square adjustment. All equipment utilized in the system is conventional and readily available in the open market.

Although the invention has been described with reference to a particular embodiment, it will be understood to those skilled in the art that the invention is capable of a variety of alternative embodiments within the spirit and scope of the appended claims.

We claim:

1. A system for correlating electronic distance measurement and aerial photography for the extension of geodetic control comprising; a plurality of electronic distance measuring stations positioned at precisely located points around an area of unknown geodetic control; a plurality of signal beacons located within area of unknown geodetic control; an airborne electronic location station having means for transmitting and receiving signals to and from said stations and said beacons; means carried by said airborne station for calculating distance, from said stations and beacons; and means for photographing the airborne electronic location station as it calculates its distance to stations and beacons, whereby said correlated precision measurement information and photographic data are suitable for photogrammetric analysis.

* * * * *